United States Patent [19]

Strange et al.

[11] Patent Number: 4,661,876
[45] Date of Patent: Apr. 28, 1987

[54] PRESSURE SENSITIVE FAULT INTERRUPTER

[75] Inventors: Thomas F. Strange; John W. Carino, both of Columbia, S.C.

[73] Assignee: North American Philips Corporation, New York, N.Y.

[21] Appl. No.: 749,615

[22] Filed: Jun. 27, 1985

[51] Int. Cl.⁴ .............................................. H02H 7/16
[52] U.S. Cl. ..................................... 361/15; 361/272; 361/275
[58] Field of Search .......................... 361/15, 273–275, 361/103

[56] References Cited

U.S. PATENT DOCUMENTS

| | | | |
|---|---|---|---|
| 3,909,683 | 9/1975 | Kysely | 361/272 |
| 4,112,474 | 9/1978 | Wilso et al. | 361/272 X |
| 4,296,453 | 10/1981 | Aigle et al. | 361/275 |
| 4,577,257 | 3/1986 | Erhardt et al. | 361/272 |

Primary Examiner—A. D. Pellinen
Assistant Examiner—Todd E. DeBoer
Attorney, Agent, or Firm—Jack E. Haken; James J. Cannon, Jr.

[57] ABSTRACT

A pressure sensitive fault interrupter for a dry metalized AC motor run capacitor having a dome-shaped diaphragm secured to one electrode at the base of a capacitor roll such that a rise in pressure within said roll will cause the dome of the diaphragm to be depressed, thereby breaking the electrical contact of one electrode, thus isolating the capacitor from its power supply.

9 Claims, 2 Drawing Figures

PRESSURE SENSITIVE FAULT INTERRUPTER

BACKGROUND OF THE INVENTION

1. Field of the Invention

The invention pertains to the field of dry metalized film AC motor run capacitors and in particular to dry metalized polypropylene capacitors having a pressure sensitive fault interrupter.

2. Description of the Prior Art

There is virtually no known prior art either in printed literature or commercially available in the area of dry metalized film capacitors having fault interrupters.

British Pat. No. 1,569,186 discloses a film capacitor in which the capacitor roll deforms when heated, breaking a contact. It is unclear whether a dry or wet capacitor is intended. The problem with this device is that by the time the internal temperature is high enough to deform the film roll, some other interruption would have occurred, such as an explosion.

U.S. Pat. No. 3,496,432 also pertains to a dry capacitor relying on temperature to break a contact.

U.S. Pat. No. 3,909,683 teaches a pressure-sensitive fault interrupter in a dry film capacitor. It provides a yielding cavity with a fusible portion of one lead wire passing therethrough. In the event of over-pressure caused by a fault, at least one contact bridge is separated. Unfortunately, gases accumulate in the cavity and can be ignited by the breaking contact. The device tends to be too explosive for commercial use.

No dry film capacitors with fault interrupters are commercially available, indicating that the few devices disclosed in the patent literature have no commercial value, despite a proposed UL requirement in Capacitor-UL-810.

The literature on wet film capacitors with fault interrupters is extensive. Typical recent U.S. patents are Nos. 4,398,782 and 4,454,561.

SUMMARY OF THE INVENTION

This invention pertains to a metalized film AC motor run capacitor having a pressure sensitive fault interrupter. The purpose of such a capacitor is to electrically isolate a dry metalized film capacitor from a power source when the capacitor has developed a complete or partial short within the windings of the capacitor itself. A pressure sensitive fault interrupter is preferred to a temperature sensitive or temperature dependent fault interrupter because when short does occur, the pressure within a capacitor will rise significantly faster than the temperature. In many prior dry film fault interrupter designs the rapid rise in pressure will cause an explosion before the temperature sensitive interrupter is activated.

In a typical dry metalized AC motor run capacitor the ends of the capacitor roll are schooped or end sprayed with tin, zinc, or another metal, to form a contact bridge. In the present invention a diaphragm of suitable size and material is rigidly attached to the contact bridge at one end of the capacitor and the tab is connected to the diaphragm. The assembled device is then placed in a can and a suitable potting material poured in so that the top of the unit is sealed. The diaphragm must be able to move relative to the fixed roll such that the maximum possible travel of the diaphragm results in breaking the connection to the capacitor with no possible restrike after 48 hours, but must remain within the confines of the case. Interruption occurs before flame or molten material exits the case or cover.

In the preferred embodiment, the diaphragm is a domed steel disc to permit flexing under pressure, the side of the dome being riveted to the tab, and the assembly is potted in polyurethane. When pressure builds up within the device, the dome diaphragm goes from concave to convex, pulling away from the contact bridge.

DESCRIPTION OF THE PREFERRED EMBODIMENT

Figure 1:
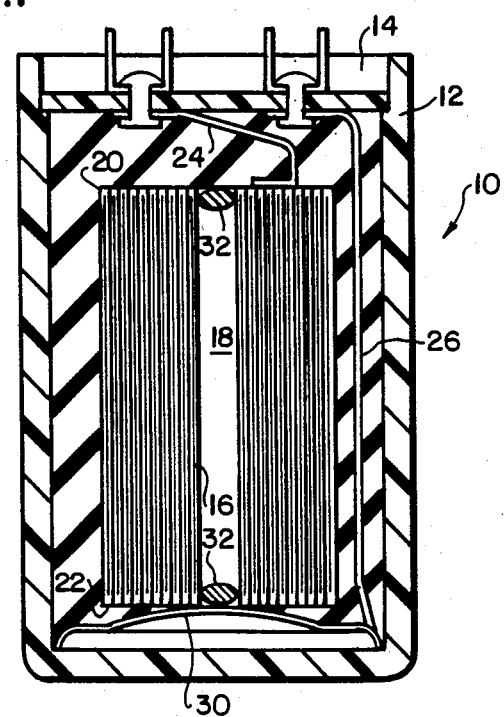
FIG. 1 is a cross-sectional view of a dry metalized film AC motor run capacitor with the pressure sensitive fault interrupter of the present invention in place.
Figure 2:
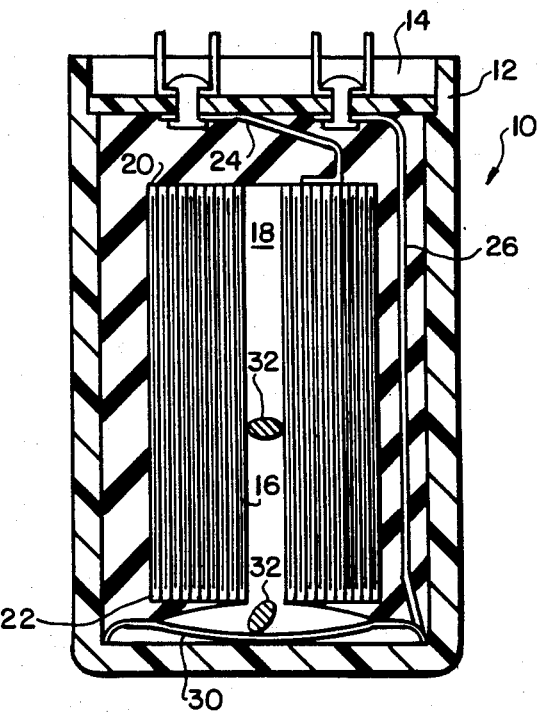
FIG. 2 is a cross-sectional view of the capacitor of FIG. 1 after a fault interruption.

FIG. 1 illustrates a dry metalized film AC motor run capacitor 10 of typical construction. Capacitor 10 has a plastic case 12, a plastic cover 14 and contains a dry metalized film capacitor section or roll 16 wound on a central arbor 18. Capacitor section 16 has metallic contact bridges 20, 22 sprayed on ends of the roll, each bridge making contact with only one of the electrodes. Typically, lead wires 24, 26 are electrically and mechanically secured to these bridges. As explained below, one lead is connected differently for the fault interrupter. The capacitor section and bottom lead 26 are potted in place within case 12.

FIG. 1 also shows the pressure sensitive fault interrupter of the present invention in operational condition installed in a typical AC motor run capacitor. The purpose of the fault interrupter is to isolate the dry metalized film capacitor from a power source when the capacitor has developed a complete or partial short within the windings of the capacitor itself. During such a fault, between the terminals 24, 26 of the capacitor 10 and internal to the capacitor section 16, pressure is developed within the roll as a result of the breakdown of the dielectric, producing various gases. These gases are able to exit the roll at the ends only. The fault interrupter of the present invention utilizes the pressure developed at either end of the roll 16 or any part thereof to break a contact as follows.

A diaphragm 30 of suitable size and material, and having a domed shape, is rigidly attached to contact bridge 22 at the base of the capacitor roll 16, and the tab is connected to the diaphragm 30. The assembled device is then placed in case 12 and a suitable potting material, preferably polyurethane, is poured in so that the top of the unit is sealed. When the unit is being potted suitable plugs 32 are placed at the top and bottom of arbor 18 to prevent the potting material from filling the arbor. This provides a void space to direct the flow of gases towards the diaphragm.

When a fault occurs, gases will exert a downward pressure on diaphragm 30 depressing it from a concave shape to a convex shape, thereby pulling away from the bridge 22, that is, the schooped base of capacitor section 16. Thus, the action of depressing the diaphragm 30 breaks the contact and electrically isolates the capacitor from its power supply and stops further reaction within the roll 16.

The diaphragm 30 must be able to move relative to the fixed section 16 such that the maximum possible travel of the diaphragm 30 results in breaking the connection between tab 26 and bridge 22, with no possible restrike within 48 hours, but it must remain within case 12. With the fault interrupter of the present invention, interruption will occur before flame or molten material exit case 12.

The pressure required to operate the fault interrupter can be between 5 and 100 p.s.i. The roll 16 can be from 0.75" to 3" diameter. The diaphragm 30 can be made from steel, aluminum or any other material that would provide the action required. The attachment of the fault interrupter to the bridge 22 of capacitor roll 16 can be made by connection to tab 26 or by direct connection to the schooped end, bridge 22, of the capacitor roll 16.

The fault interrupter of the present invention differs significantly from and has many advantages over the prior art. It uses only normal connections; no special connections are required. It is a simple external device. No special case is required. The case does not require a special hermetic seal. The device works with a fully encapsulated roll without requiring case dimensions to charge in order to interrupt a circuit.

What is claimed:

1. An AC capacitor having a pressure sensitive fault interrupter for its capacitor section, wherein said capacitor is a dry metallized film AC motor start or motor run capacitor, wherein said capacitor includes a metallized foil capacitor section, said section having a void core, a contact bridge for each electrode of said capacitor section, one contact bridge being on each end of said capacitor section, connecting tabs to said contact bridges, said capacitor being connectable to a circuit through said connecting tabs, a case, potting material securing said capacitor section within said case, and connecting terminals for said tabs in a cover for said case, wherein the fault interrupter for said capacitor section comprises:
   a diaphragm mechanically and electrically attached to a contact bridge at the base end of said capacitor section;
   a tab connection for one electrode through said diaphragm to one of said connecting terminal;
   a plug positioned over the upper end of said core;
   said capacitor section with said diaphragm connected thereto being positioned within said case, such that the perimeter of said diaphragm is in firm contact with the base of said case and a void space is left beneath said diaphragm to permit a movement thereof;
   potting material disposed around said capacitor section within said case such that said capacitor section is firmly sealed within said case; and
   said diaphragm being secured to the bottom of said capacitor section within said case such that, when a fault occurs, said diaphragm is depressed by gaseous pressure from within the core of the capacitor section to break the electrical contact between said diaphragm and its contact bridge, thereby electrically isolating the faulty capacitor section.

2. The capacitor of claim 1 wherein said diaphragm is dome-shaped, having a concave shape in operational condition and a convex shape after depression.

3. The capacitor of claim 1 wherein said diaphragm is a metal.

4. The capacitor of claim 1 wherein said diaphragm is steel.

5. The capacitor of claim 1 wherein said potting material is polyurethene.

6. The capacitor of claim 1 wherein said diaphragm is directly connected to the bridge of said roll.

7. The capacitor of claim 1 in which the pressure of an extruded core capacitor section caused by overheating suffices to depress said diaphragm, breaking the electrical contact between said diaphragm and its contact bridge.

8. An AC capacitor having a pressure sensitive fault interrupter for its capacitor section, wherein said capacitor is a dry metallized film AC motor start or motor run capacitor, wherein said capacitor includes a metallized foil capacitor section, said section having a void core, a contact bridge for each electrode of said capacitor section, one contact bridge being on each end of said capacitor section, connecting tabs to said contact bridges, said capacitor being connectable to a circuit through said connecting tabs, a case, potting material securing said capacitor section within said case, and connecting terminal for said tabs in a cover for said case, wherein the fault interrupter for said capacitor section comprises:
   a diaphragm mechanically and electrically attached to a contact bridge at the base end of said capacitor section;
   a tab connection for one electrode through said diaphragm to one of said connecting terminals;
   a plug positioned over the upper end of said core;
   said capacitor section with said diaphragm connected thereto being positioned within said case, such that the perimeter of said diaphragm is in firm contact with the base of said case and a void space is left beneath said diaphragm to permit a movement thereof;
   potting material disposed around said capacitor section within said case such that said capacitor section is firmly sealed within said case; and
   said diaphragm being secured to the bottom of said capacitor section within said case such that, when a heat induced fault occurs, said diaphragm is depressed by pressure in the core of said capacitor section to break the electrical contact between said diaphragm and its contact bridge, thereby electrically isolating the faulty capacitor.

9. The capacitor of claim 8 wherein said diaphragm is dome-shaped, having a concave shape in operational condition and a convex shape after depression.

* * * * *